United States Patent [19]

Langrehr et al.

[11] 4,180,321

[45] Dec. 25, 1979

[54] CONTROL SYSTEM FOR PHOTOGRAPHIC FILM PRINTER

[75] Inventors: Larry L. Langrehr, Chicago; Charles J. Watson, Elgin, both of Ill.

[73] Assignee: Bell & Howell Company, Chicago, Ill.

[21] Appl. No.: 916,621

[22] Filed: Jun. 19, 1978

[51] Int. Cl.[2] .......................................... G03B 27/78
[52] U.S. Cl. ................................ 355/83; 235/92 CA; 355/88
[58] Field of Search ............... 355/83, 88; 235/92 CA, 235/92 EV

[56] References Cited

U.S. PATENT DOCUMENTS

| | | | |
|---|---|---|---|
| 3,586,438 | 6/1971 | Gyori | 355/83 X |
| 4,045,136 | 8/1977 | Watson et al. | 355/83 |

Primary Examiner—Richard A. Wintercorn
Attorney, Agent, or Firm—Robert J. Schneider; Gerald B. Epstein; Roger M. Fitz-Gerald

[57] ABSTRACT

A printer control unit utilizes a microprocessor and a random-access memory for storing color and cuing information in order to eliminate the need for continuously reading a tape during the printing operation. The printer control unit utilizes a single tape reader and the microprocessor is programmed to permit color tapes, cuing tapes or composite tapes to be read by the single tape reader.

14 Claims, 5 Drawing Figures

CONTROL SYSTEM FOR PHOTOGRAPHIC FILM PRINTER

BACKGROUND OF THE INVENTION

1. Field of the Invention

The present invention relates generally to control systems, and more particularly to control systems for photographic printers.

2. Description of the Prior Art

Control systems for photographic film printers are known. One such printer is described in U.S. Pat. No. 4,045,136, and utilizes digital control logic for controlling the operation of light valves in a photographic film printer. Information for controlling the operation of the control system is contained on paper tapes which are read into the control system by a tape reader. The tapes may take the form of a composite tape containing both color information and cuing information, or the system may read a tape having color information only, with the cuing information being obtained from an external source or from a second tape containing the cuing information. In such a system, the tape (or tapes) are continuously run through a tape reader (or readers) during the printing operation in order to control the operation of the printer.

While such a printer control system provides a way to control the operation of a photographic film printer automatically, the continuous reading of one or more tapes is disadvantageous since the physical presence of the tapes during the printing process in a nuisance, and containers for the tapes, some of which may be quite long, must be provided. The continuous reading of a tape results in rapid tape wearout, and the tape may be damaged by an inattentative operator. Moreover, the continuous reading of tapes can result in tape jams and more rapid wearout of the tape reader. Finally, two separate tape readers must be provided if a two tape reading capability is desired. Such separate readers increase the overall cost of the system.

SUMMARY OF THE INVENTION

Accordingly, it is an object of the present invention to provide a control system for photographic film printers that overcomes many of the disadvantages of the prior art control systems.

It is yet another object of the present invention to provide a control system for photographic film printers that can read color, composite and cuing tapes with a single tape reading head.

It is still another object of the present invention to provide a control system for photographic film printers that does not require the continuous reading of a tape during the photographic printing process.

In accordance with an important aspect of the invention, a microprocessor and a random-access memory are employed in the interface between the tape reading head and the logic circuitry of a printer control system such as the one described in U.S. Pat. No. 4,045,136. The microprocessor recognizes whether the tape being read is a composite tape, a color tape or a cuing tape and stores the information contained on the tape in appropriate locations in the random-access memory. If the tape is a composite tape, the information is placed in the memory exactly as read. If the tape is a color tape, the information is read into locations assigned for color information. If the tape is a cuing tape, the information is read into locations reserved for cuing information. When separate tapes are read, the color and cuing information is interleaved so that the information, as stored in the memory, appears as if it had been read in from a composite tape. The microprocessor then provides the information to the rest of the logic circuitry in the same manner as if a composite tape were being read. Continuous loop capability is also provided, and the storage and erasure of information is controlled by the position of the lid on the tape reading head.

BRIEF DESCRIPTION OF THE DRAWING

These and other objects and advantages of the present invention will become apparent from the following detailed description and attached drawing, wherein.

DETAILED DESCRIPTION OF THE PREFERRED EMBODIMENT

Figure 1:
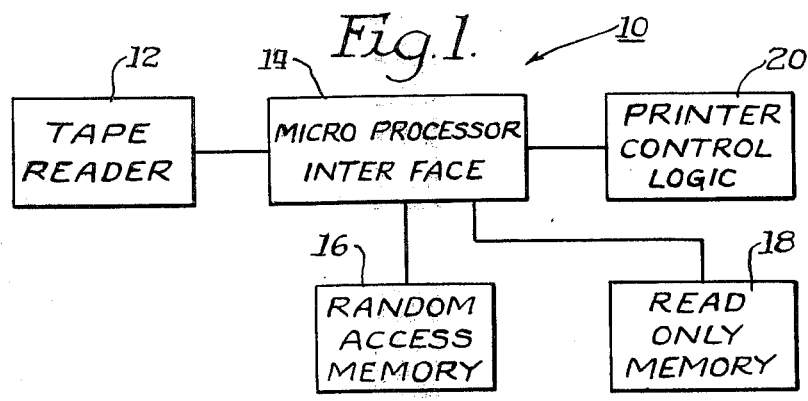
FIG. 1 is a simplified block diagram of the printer control unit according to the invention.

Referring now to the drawing, with particular attention to FIG. 1, there is shown an improved printer control unit generally designated by the reference numeral 10. The printer control unit 10 utilizes a single head tape reader 12, a microprocessor interface 14, a random-access memory 16 and a read-only memory 18 in conjunction with a printer control logic 20. In the embodiment shown, the tape reader 12 is similar to the tape reader 24 shown in FIG. 1 of U.S. Pat. No. 4,045,136 except that the tape reader 12 has only a single tape reading head. The microprocessor interface 14, the random-access memory 16 and the read-pnly memory 18 replace the interface 26, and the printer control logic 20 represents the rest of the circuitry shown in FIG. 1 of U.S. Pat. No. 4,045,136.

In accordance with an important aspect of the present invention, the printer control unit according to the invention is capable of reading any of the standard tapes read by the printer control unit described in the aforesaid U.S. Pat. No. 4,045,136. Thus, the unit can be operated in several modes. For example, the unit may be operated from a color tape containing only color information for controlling the operation of three light valves and an external source of cuing. Such an external source of cuing may include a notch or a patch on the negative being printed, or an external frame count cuer. The unit may also be operated with separate tapes, one tape providing the color information and the other tape providing the cuing information. In addition, the unit may be operated from a composite tape that contains interleaved cuing and color information.

Figure 2:
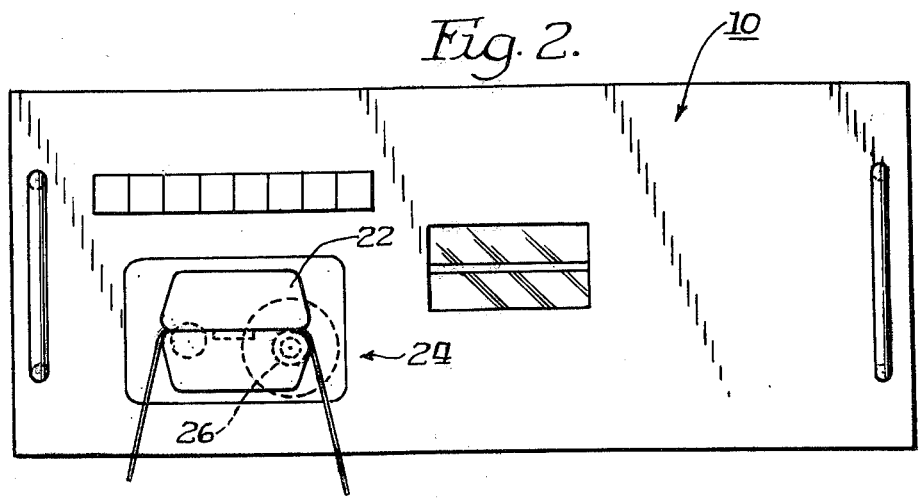
FIG. 2 is a front view of the printer control unit according to the invention showing the tape reading head.
Figures 3, 4:
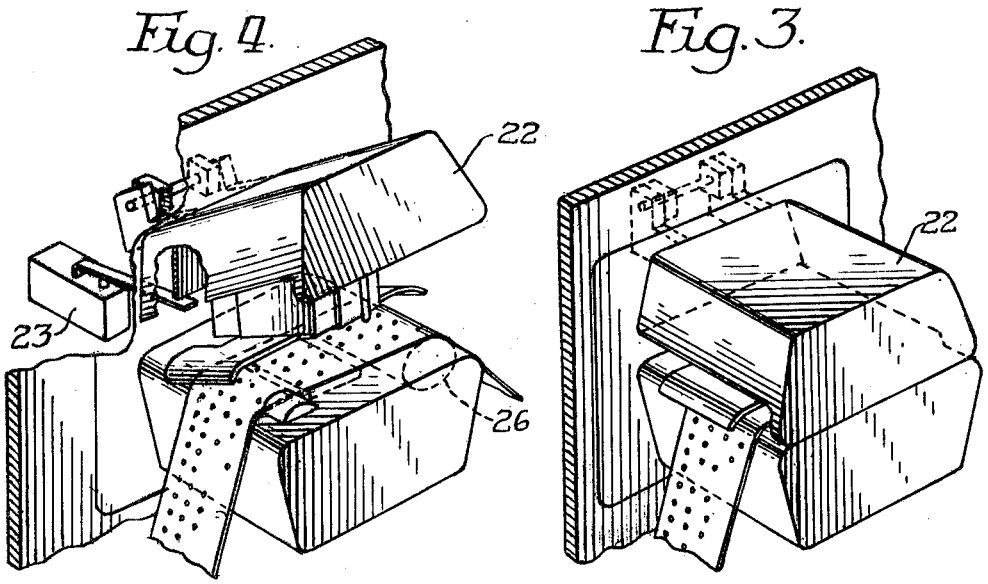
FIGS. 3 and 4 are perspective views of the reading head showing the retaining lid in a raised and in a lowered position.

In operation, a tape is read into the random-access memory 16 under the control of the microprocessor interface 14 which is programmed by the read-only memory 18. The tape is read into the random-access memory 16 by first lifting the lid 22 of the head 24 of the tape reader 12 (FIGS. 2 and 3) and placing the tape to be read over the transport mechanism 26 within the head 24. The lifting of the lid 22 operates the switch 23 which clears the random-access memory 16 to permit the contents of the tape to be read into the memory. The lid 22 is then lowered over the tape and the transport mechanism automatically transports the tape through the reading head 24 until an 8-level punch, also known as a stop-8 punch is encountered. When such an 8-level punch is encountered, the direction of the transport mechanism is reversed by the microprocessor interface 14 and the tape is read in the reverse direction. During the reverse direction reading, the information from the tape is compared with the information stored in the random-access memory 16 during the forward reading operation to provide an error check.

During the reading of a tape, the microprocessor interface 14 recognizes the type of tape being read based on a preamble or lack thereof punched at the beginning of the tape. For example, a color tape may have no special preamble other than an initial 8-level punch (or start-8 punch) indicating the beginning of the information. A tape having frame count cuing information may have, for example, a 3-level and a 4-level punch ahead of the 8-level punch to indicate to the microprocessor 14 that the tape is a cuing tape. Similarly, a composite tape may have either a single 3-level or a single 4-level punch ahead of the 8-level punch to indicate that the tape is a composite tape. It should, of course, be understood that the particular preambles mentioned above are for illustrative purposes only, and any suitable preamble may be used by suitably programming the microprocessor interface 14.

If the tape is recognized as a color tape, the information contained on the tape up through the stop-8 punch in entered into the memory. The direction of the transport mechanism 26 is then automatically reversed by the microprocessor interface 14 and the tape is transported through the reading head 24 in the reverse direction and the data previously entered is verified. If a mistake is found in the data, the transport mechanism 26 is stopped by the microprocessor interface 14. This forces the operator to raise the lid 22 in order to remove the tape, and such a raising of the lid 22 erases the random-access memory 16. The tape is then replaced in the reading head 24, the lid 22 lowered and the process is repeated until a proper verification is obtained. When such a verification is obtained, the transport mechanism 26 of the tape reader 12 is deenergized by the microprocessor 14, thus permitting the tape to be pulled out by the operator without raising the lid 22. The system is now programmed to operate with external cuing information, such as notch or patch cuing, or with cuing from an external frame count cuer, and the color information stored in the random-access memory 16 is read out by the microprocessor interface 14 and applied to the printer control logic 20 in the same manner as if a color tape were being read.

If the tape being read is recognized as a composite tape, the information on the tape is read into the memory 16 exactly as it appears on the tape. The direction of the tape is then reversed as in the case of a color tape, and the information is verified. If the information has been correctly read in, the transport mechanism 26 of the tape reader 12 is again deenergized to permit the tape to be withdrawn. The microprocessor 14 now provides information from the random-access memory 16 to the printer control logic 20 in the same manner as if a composite tape were being read.

When it is desired to utilize separate color and frame count cuing tapes, the frame count cuing tape is read first. When the frame count cuing tape is identified by the microprocessor interface 14 as a frame count cuing tape, the information from the frame count cuing tape is read into locations within the random-access memory 16 that are designated as cuing information locations. The information contained on a color tape is subsequently stored in locations allocated to color information.

When the frame count cuing tape is read by the tape reader 12, the tape is advanced through the tape reader 12 by the microprocessor 14 by an amount equal to the number of steps required to define a cue. In the present embodiment, twelve steps of the tape are required to define a cue, however, other numbers of steps may be used with other data formats. The first twelve steps defining the first cue are entered into twelve locations within the random-access memory 16 that have been designated as cuing information locations. After the information corresponding to the twelve cuing steps has been stored in the random-access memory 16, locations corresponding to four steps are skipped. These locations will later be filled with color information. In the present format, four steps are required to define each color, however, as in the case of the cuing information, other formats may be used. The tape is then advanced another twelve steps and the information is stored in the next twelve locations within the memory 16. The next four locations are skipped and the process is repeated with the information from the cuing tape being stored in the memory 16 in groups of twelve adjacent locations interleaved with groups of four vacant locations until the entire cuing tape has been read.

Once the cuing tape has been read in the forward direction, the tape is read again in the reverse direction and the data verified. However, when a cuing tape has been read, the transport mechanism 26 within the tape head 24 is not deenergized, but rather it is maintained in a stationary position by the microprocessor 14. Thus, the tape cannot be pulled out of the head 24 without lifting the lid 22 as had been the case when a color or composite tape had been read. The operator must, therefore, lift the lid 22 in order to remove the cuing tape. However, after a cuing tape has been read, the lid 22 may be lifted once without erasing the information stored in the random-access memory 16. The raising of the lid 22 permits a color tape to be placed in the tape reader 12, and after the lid 22 is closed, the color tape is read in blocks of four steps. Each such block of four steps, which, in the present embodiment, contains all the information necessary to make a single color change, is stored in the four vacant locations following the twelve locations containing the first twelve steps of cuing information. The second four steps of information from the tape are placed in the next four vacant locations within the memory 16, and so forth, until the color tape has been completely read. The stored color information is verified by reading the tape in the reverse direction, and if correct, the tape transport mechanism 26 within the tape reader 12 is deenergized by the microprocessor 14 to permit the color tape to be withdrawn. The information stored in the random-access memory 16 now has the same format as a composite tape, and when the stored information is applied to the printer control logic 20 by the microprocessor interface 14, it appears to the printer control logic 20 that a composite tape is being read.

In prior art systems, such as the system described in U.S. Pat. No. 4,045,136, if endless loop operation is desired, the 8-level punches indicating the start and stop of a color tape must be removed and the ends of the tape spliced together. Thus, the color tape becomes an endless loop containing only color information that is executed by an internal or external cuing system. Such cuing may be provided by an endless loop frame count cuing tape that is designated as an endless loop tape by having a very large value, such as 8,000 feet, added to the value of the last entry. Since a tape having a length in excess of 8,000 feet is not normally printed, the large number causes the tape to be recognized as an endless loop tape and both the color tape and the frame count cuing tape are continuously looped through the reading heads of the printer control unit.

The system according to the invention simulates the above action without actually looping the tape. When endless loop operation is desired, a flag bit is provided for the microprocessor by manually entering the flag bit into the microprocessor by an appropriate push button on the panel, or by placing a flag bit, such as, for example, a 1-level punch ahead of the start-8 punch on a composite or frame count cuing tape. Such a 1-level punch does not destroy the compatibility of the tape with prior art systems since a 1-level punch is normally ignored by such prior art systems. The last cuing entry must also contain information defining the distance between the last frame and the head sync frame of the looped negative being printed in order to permit the counter within the frame count cuer to be reset to zero each time the sync frame on the looped negative reappears. This information is generally stored by adding the distance between the last frame and the sync frame of the looped negative to the last frame count, and adding the previously mentioned 8,000. The 8,000 is ignored by the system, and only the numbers corresponding to the last frame and the first frame of the looped negative are entered in the memory.

Thus, all of the information necessary for loop operation has been entered, and when the printing operation is initiated, the printing is controlled by the information stored in the random-access memory until the negative has been completely looped around to its sync frame. At this point, the frame count is equal to the last stored frame count indicating the beginning of the loop and the counter within the printer control unit 20 is reset to zero and the process repeated for the second pass of the looped negative.

Figure 5:
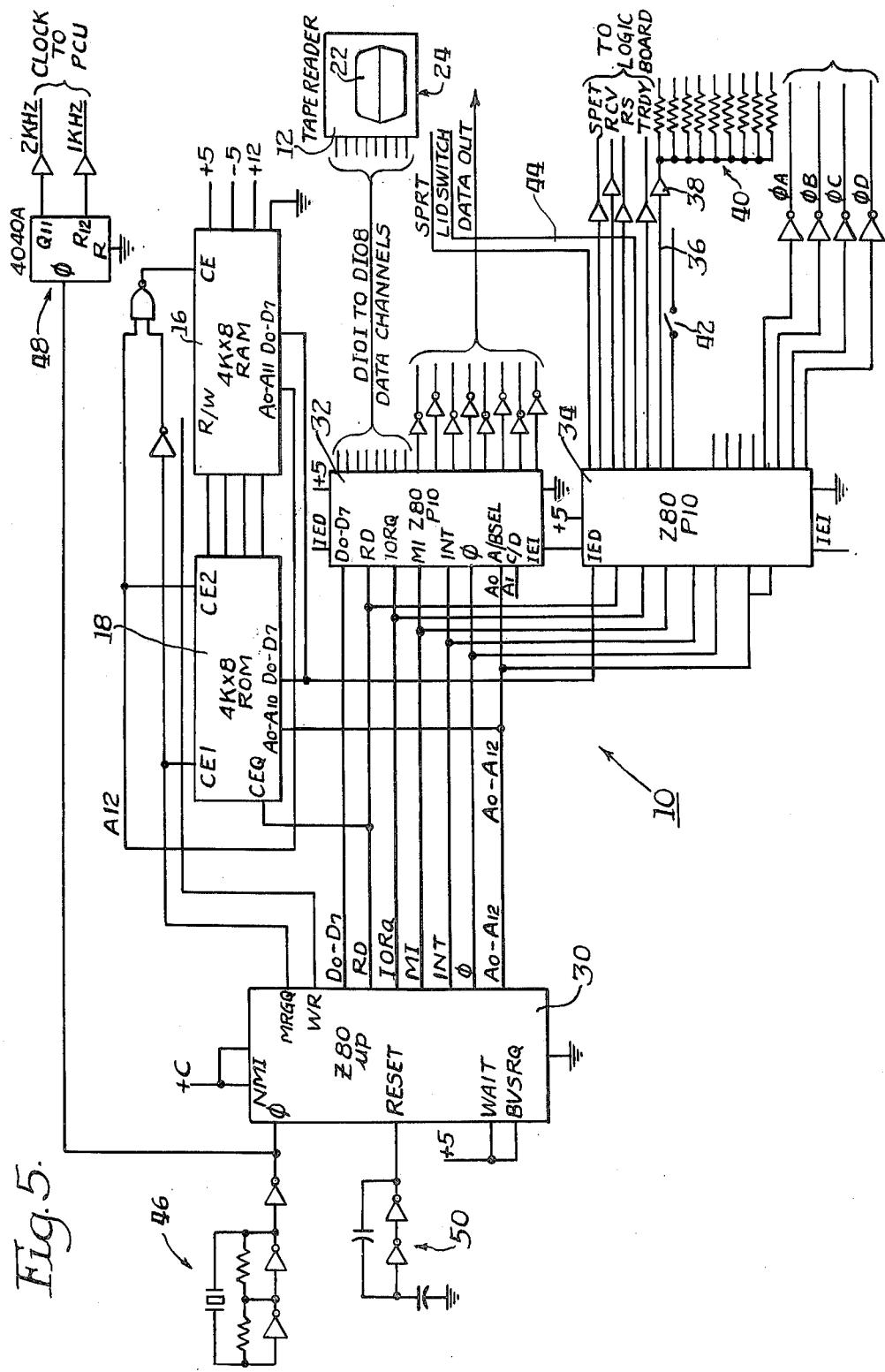
FIG. 5 is a partial schematic diagram of the printer control unit according to the invention showing the memories and the microprocessor.

FIG. 5 shows the control unit 10 in greater detail. In the present embodiment, the microprocessor interface 14 (FIG. 1) is made up of a microprocessor 30 and a pair of peripheral interface adapters 32 and 34. Although various microprocessors may be used, in the present embodiment, the microprocessor 30 is a Zilog Z-80 microprocessor and the peripheral interface adapters 32 and 34 are Zilog Z-80 peripheral interface adapters. The random-access memory 16 is used to store the information read by the tape reader 12, and a Zilog 4k×8 random-access memory has been found to be suitable. The read-only memory 18 is used to store program instructions for the microprocessor 30, and an Intel 1k×8 read-only memory has been found to be suitable for this purpose.

In operation, data from the tape reader 12 is applied to the peripheral interface adapter 32 via eight input lines, each corresponding to one of eight possible punch positions on the tape. The peripheral interface adapter 32 also has eight output lines DI01 to DI08 which provide output data to the logic circuitry of the printer control unit 20 in the same format as the data provided by the tape reader 12. The input data from the tape reader 12 is applied by the peripheral interface adapter 32 to the microprocessor 30 via lines D0-D7. The microprocessor 30 stores the data in the random-access memory 16 under the control of the program stored in the read-only memory 18 until the data is required for the operation of the printer, at which time the data is read out and applied to the data output lines DI01-DI08.

In addition to receiving and outputting data, the unit 10 according to the invention provides control signals to the printer control logic 20 and to the tape reader 12. This is accomplished by the peripheral interface adapter 34 which provides a four-phase signal to a stepping motor (not shown) within the tape reader 12 via its four lowermost outputs. The stepping motor, in turn, advances the transport mechanism in order to advance the tape through the head 24.

The peripheral interface adapter 34 also provides power to operate eight light emitting diodes (not shown) within the reading head 24 that serve as sources of light for the tape reading operation. This power is applied to the light emitting diodes via a line 36, an amplifier 38 and eight resistors 40 connecting the output of the amplifier 38 to each of the light emitting diodes. Finally, sprocket (SPKT), reverse (REV), recorder step (RS) and transmit ready (TRDY) signals are also provided to the control logic 20 to indicate operating status. A switch 42 is used to provide the endless loop flag for the microprocessor 30 and the lid switch 23 (FIG. 3) is connected to the peripheral interface adapter 34 via a lid switch line 44 (FIG. 5) to indicate that the lid 22 has been raised. A crystal controlled clock 46 provides a time base for the microprocessor Z80, and also drives a digital divider 48 to provide lower frequency clock signals for the control logic 20. An integrator 50 is connected to the reset input of the microprocessor 30 to cause the microprocessor to be reset each time power to the unit is turned on.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A control unit for controlling the operation of a photographic printer comprising:
   means including a single tape reading head for reading digital information punched on a tape;
   means including a memory for storing information read by said reading head; and
   control means coupled to said memory and to said reading means for rendering said reading means operative to read information from said tape and for rendering said memory operative to store said information, said control means including output means for reading the information stored in said memory and for providing an output signal for controlling the operation of said printer in response to the information stored in said memory.

2. A control unit as claimed in claim 1 wherein said reading head includes a lid member for retaining said tape within said reading head and means responsive to the position of said lid member for erasing said memory when said lid member is raised.

3. A control unit as claimed in claim 1 wherein said control means includes means for rendering said reading head operative to read said tape in a forward and in a reverse direction, wherein said control means further includes means for comparing the information read in a forward direction with the information read in the reverse direction.

4. A control unit as claimed in claim 1 wherein said control means includes means responsive to a predetermined identifying code disposed on said tape for determining whether said tape contains color information, cuing information or a composite of color and cuing information.

5. A control unit as claimed in claim 4 wherein said identifying code responsive means includes means for altering the format in which said information is stored in said memory in response to said identifying code.

6. A control unit as claimed in claim 5 wherein said format altering means is operative to store said information in adjacent locations in said memory in the same sequence as the information is read from said tape when said identifying code identifies the tape as a composite tape.

7. A control unit as claimed in claim 5 wherein said format altering means is operative to store said information in adjacent locations in said memory in the same sequence as the information is read from the tape when said identifying code identifies the tape as a tape containing color information.

8. A control unit as claimed in claim 5 wherein said format altering means is operative to store said information in locations allocated to cuing information interleaved with vacant locations allocated to color information when said identifying code identifies said tape as a cuing tape.

9. A control unit as claimed in claim 8 wherein said reading head includes a lid member for retaining said tapes within said reading head and means responsive to the position of said lid for erasing said memory when said lid member is raised, and wherein said identifying code responsive means is operative to inhibit the operation of said erasing means to permit said lid to be raised once without erasing said memory subsequent to the reading of a tape identified as a cuing tape.

10. A control unit as claimed in claim 9 wherein said format altering means is operative to store said information in said vacant locations allocated to color information when a tape containing color information is read immediately following the reading of a cuing tape.

11. A control unit for controlling the operation of a photographic film printer in accordance with color and cuing information, said color information being obtained from a tape containing only color information or on a composite tape containing color and cuing information, said cuing informaion being obtained from said composite tape, a separate cuing tape or an external source, said control unit comprising:
   means including a tape reader for reading digital information punched on said tape, said tape reader having only a single reading head;
   means including a memory for storing digital information read by said tape reader;
   means including a microprocessor responsive to digital information read by said tape reader for determining whether said tape is a color tape, a composite tape, or a cuing tape, said microprocessor being operative to cause information from a color tape or a composite tape to be stored in said memory in the order said information is read by said reader, and for interleaving information read from a color tape with information read from a cuing tape when a cuing tape is read immediately preceding the reading of a color tape; and
   means responsive to the information stored in said memory for controlling the operation of said printer.

12. A control unit as claimed in claim 11 wherein said tape reader includes means including a transport mechanism for transporting said tape through said reading head and means for energizing said transport mechanism to cause said transport mechanism to transport said tape through said reading head in a forward and a reverse direction, said energizing means being operative to deenergize said transport mechanism to permit the withdrawal of said tape after said tape has been read if said tape has been identified as a composite tape or a tape containing only color information.

13. A control unit as claimed in claim 12 wherein said energizing means further includes means for maintaining said transport mechanism energized in a stationary condition of operation to prevent the withdrawal of a tape identified as a cuing tape.

14. A control unit as claimed in claim 13 further including a lid member movable to a raised position and a lowered position, and means including a switch responsive to the position of said lid member for erasing the information stored in said memory when said lid member is moved from said lowered position to said raised position, said microprocessor including means for inhibiting the operation of said erasing means after a cuing tape has been read to permit said lid member to be moved to the raised position one time following the reading of a cuing tape to thereby permit a color tape to be read following the reading of a cuing tape.

* * * * *